US011921083B2

(12) United States Patent
Slobodan et al.

(10) Patent No.: US 11,921,083 B2
(45) Date of Patent: Mar. 5, 2024

(54) DEVICE FOR CAPTURING MACROMOLECULES AND METHODS FOR MANUFACTURING AND USING SAME

(71) Applicant: COASTAL GENOMICS INC., Burnaby (CA)

(72) Inventors: Jared Slobodan, Nanaimo (CA); Andrew Nobles, Vancouver (CA)

(73) Assignee: YOURGENE HEALTH CANADA INC., Port Coquitlam (CA)

( * ) Notice: Subject to any disclaimer, the term of this patent is extended or adjusted under 35 U.S.C. 154(b) by 468 days.

(21) Appl. No.: 17/251,424

(22) PCT Filed: Jun. 13, 2019

(86) PCT No.: PCT/CA2019/050840
§ 371 (c)(1),
(2) Date: Dec. 11, 2020

(87) PCT Pub. No.: WO2019/237205
PCT Pub. Date: Dec. 19, 2019

(65) Prior Publication Data
US 2021/0109062 A1 Apr. 15, 2021

Related U.S. Application Data

(60) Provisional application No. 62/685,056, filed on Jun. 14, 2018.

(51) Int. Cl.
*G01N 27/447* (2006.01)
*B01D 57/02* (2006.01)

(52) U.S. Cl.
CPC ....... *G01N 27/44756* (2013.01); *B01D 57/02* (2013.01)

(58) Field of Classification Search
CPC ....... G01N 27/44704; G01N 27/44739; G01N 27/44756; B01D 57/02
See application file for complete search history.

(56) References Cited

U.S. PATENT DOCUMENTS

| | | | |
|---|---|---|---|
| 4,608,147 A | 8/1986 | Clad | |
| 4,913,791 A * | 4/1990 | Hurd | G01N 27/44739 204/615 |
| 5,217,592 A * | 6/1993 | Jones | G01N 27/44717 204/614 |
| 6,602,391 B2 | 8/2003 | Serikov | |
| 6,942,771 B1 | 9/2005 | Kayyem | |

(Continued)

FOREIGN PATENT DOCUMENTS

| | | | |
|---|---|---|---|
| GB | 2177211 A | 1/1987 | |
| GB | WO87002132 A1 * | 4/1987 | G01N 27/26 |

(Continued)

OTHER PUBLICATIONS

PCT International Search Report and Written Opinion, PCT/CA2019/050840, dated Aug. 22, 2019, 10 pages.

(Continued)

*Primary Examiner* — Caitlyn Mingyun Sun
(74) *Attorney, Agent, or Firm* — Quarles & Brady LLP

(57) ABSTRACT

The present disclosure provides an in-channel filtration device for capturing one or more macromolecules from an electrophoretic gel, and methods for manufacturing and using same.

19 Claims, 11 Drawing Sheets

(56) References Cited

U.S. PATENT DOCUMENTS

| | | | |
|---|---|---|---|
| 9,753,008 B2 | 9/2017 | Woodham | |
| 2010/0044229 A1* | 2/2010 | Margalit | G01N 33/561 |
| | | | 204/461 |
| 2016/0313281 A1 | 10/2016 | Goto et al. | |

FOREIGN PATENT DOCUMENTS

| | | |
|---|---|---|
| JP | 2011145137 A | 7/2011 |
| WO | 8702132 A1 | 4/1987 |
| WO | 2018067736 A1 | 4/2018 |

OTHER PUBLICATIONS

European Patent Office, Supplementary Search Report, Application No. 19820120, dated Feb. 3, 2022, 2 pages.

* cited by examiner

DEVICE FOR CAPTURING MACROMOLECULES AND METHODS FOR MANUFACTURING AND USING SAME

CROSS REFERENCE TO PRIOR APPLICATIONS

This application represents the national stage entry of PCT International Application No. PCT/CA2019/050840, filed Jun. 13, 2019, which claims priority to U.S. Provisional Patent Application No. 62/685,056, filed Jun. 14, 2018, the contents of which are incorporated herein by reference as if set forth in their entirety.

FIELD OF THE DISCLOSURE

The present description relates generally to a device for use in gel electrophoresis. More particularly, the description relates to a device for recovering one or more macromolecules from electrophoretic gels and to the manufacture and use thereof.

BACKGROUND OF THE DISCLOSURE

Gel electrophoresis is an established method for separating a plurality of macromolecules in a mixed sample based on the size and/or charge of the molecules. Macromolecules that can be separated by gel electrophoresis include nucleic acids (double-stranded DNA, single-stranded DNA, RNA) and polypeptides. Agarose gel electrophoresis comprises electric field-driven migration of negatively-charged DNA molecules through a porous agarose matrix towards a positively charged electrode. Smaller DNA molecules encounter less resistance than larger DNA molecules when migrating through the porous agarose matrix, thereby allowing the smaller DNA molecules to migrate faster and separate from the larger DNA molecules. This separation facilitates the isolation of DNA molecules of a defined length, while excluding DNA molecules of undesirable length. As such, agarose gel electrophoresis is widely utilized for DNA size selection in the fields of molecular biology, clinical biology, genetics, genomics, biochemistry and clinical chemistry.

Recovery of size-selected DNA molecules from an electrophoretic gel is essential for downstream applications including, inter alia, DNA cloning and DNA sequencing. Optimally, the recovered DNA will be high in purity and concentration, without a significant loss of the DNA present in the initial mixed sample, and further without the introduction of any contaminants.

Current methods of recovering DNA from an electrophoretic gel include: (1) cutting out a slice of the gel corresponding to a band of DNA molecules of a particular length, followed by extraction of DNA from the gel slice and precipitation of DNA; and (2) collecting an aliquot or series of aliquots directly from the electrophoretic gel at a point in the gel that is accessible to a pipette, known in the art as an "extraction well", followed by precipitation of DNA. Both of these methods are laborious, time-consuming and require a skilled individual practitioner to conduct numerous manually-performed steps, which leads to variable outcomes with respect to the purity and concentration of the recovered DNA. Furthermore, both methods rely on precipitation of the size-selected DNA, which can then be re-suspended in a reduced volume, in order to obtain a final DNA sample of suitable concentration for downstream applications. Beyond necessitating the cost of another step, a fraction of DNA is lost through such precipitation.

There are examples of devices designed to address one or more of the above challenges associated with recovering DNA from electrophoretic gels. A macromolecule recovery cassette that enabled recovery of target ranges of molecular sizes in a fixed, low-volume aliquot, has been previously described. This cassette is comprised of a U-frame with a DNA-permeable membrane on one side, and a DNA-impermeable recovery membrane on the opposite side. By inserting the cassette in an extraction well at a time-point that coincides with the arrival of a first fraction of a DNA target range, electrophoresis can be continuously run to drive the entire target range into the chamber of the cassette. Subsequently, a pipette can be used to re-suspend DNA into the fixed volume via agitation. However, some deficiencies remain with the existing macromolecule recovery cassettes, including: (1) the elution volume remains relatively large (approximately 50 µl) and has a lower limit set upon it by the surface area requirements of the DNA-permeable membrane; (2) said surface area should match that of the agarose gel cross sectional area through which DNA migrates in order to provide optimal resolution of the electrophoretic process and to allow all DNA to pass into the chamber of the recovery cassette; and (3) the recovery cassette requires careful fabrication processes (i.e., adhesion) to prevent formation of electrical conduits that would allow DNA to circumvent the recovery membrane.

It is an object of the present disclosure to mitigate and/or obviate one or more of the above deficiencies.

SUMMARY OF THE DISCLOSURE

The present disclosure is broadly summarized as relating to devices and methods for recovering one or more macromolecules from an electrophoretic gel.

In an aspect, there is provided a device for capturing one or more macromolecules from an electrophoretic gel, the device comprising: a substantially electrically resistive support frame having a top, a bottom, a first side and a second side, defining a first open area and a second open area, the second open area positioned opposite the first open area; a substantially electrically resistive aperture membrane having a through-hole positioned in a central area, the aperture membrane configured to cover the second open area of the support frame and configured to have a surface area that is less than the surface area defined by the dimensions of the support frame or defined by the cross-sectional area of the electrophoretic gel; and a recovery membrane positioned adjacent to the aperture membrane and configured to cover the through-hole of the aperture membrane.

In another aspect, there is provided a device for capturing one or more macromolecules from an electrophoretic gel, the device comprising: a substantially electrically resistive support frame having a top, a bottom, a first side and a second side, defining a first open area and a second open area, the second open area positioned opposite the first open area; a substantially electrically resistive aperture membrane having a through-hole positioned in a central area, the aperture membrane configured to cover the second open area of the support frame and configured to have a surface area that is less than the surface area defined by the dimensions of the support frame or defined by the cross-sectional area of the electrophoretic gel; and a recovery membrane positioned adjacent to the aperture membrane and configured to cover the through-hole of the aperture membrane; wherein the support frame further comprises a first recess and a second recess configured for engagement by a tool to move the device. In an embodiment, the first recess and the second recess are configured to form a through-hole extending between the first recess and the second recess. In an embodiment, the first and second recesses are configured to form a recess through-hole extending between the first and second recesses to permit at least a portion of the tool to pass through the support frame.

In an embodiment of the above aspects of the invention, the device further comprises a macromolecule-permeable membrane configured to separate the first open area of the support frame from the second open area of the support frame, and positioned proximal to the first open area of the support frame. In an embodiment, the recovery membrane is positioned between the aperture membrane and the macromolecule-permeable membrane.

In an embodiment of the above aspects of the invention, the device further comprises a chamber defined by the support frame, the macromolecule-permeable membrane, and the recovery membrane.

In an embodiment of the above aspects of the invention, the aperture membrane is integrated into the support frame.

In an embodiment of the above aspects of the invention, the device further comprises one or more press-fit pieces configured to pressurably seal the macromolecule-permeable membrane between the first open area of the support frame and the second open area of the support frame.

In an embodiment of the above aspects of the invention, the device further comprises one or more press-fit pieces configured to pressurably seal the recovery membrane against the aperture membrane. In an embodiment, the one or more press-fit pieces is a press-fit insert configured for positioning within the chamber and for pressurably sealing the recovery membrane against the aperture membrane. In an embodiment, the one or more press-fit pieces is a press-fit retainer configured for positioning within the first open area of the support frame and for pressurably sealing the macromolecule-permeable membrane between the press-fit insert and the press-fit retainer.

In an embodiment, the macromolecule-permeable membrane is sealed to the support frame using adhesive bonding.

In an embodiment of the above aspects of the invention, the recovery membrane is sealed to the support frame using adhesive bonding. In an embodiment of the above aspects of the invention, the recovery membrane is sealed to the aperture membrane using adhesive bonding. In and embodiment, the adhesive bonding forms a seal that is fully intact. In an embodiment, the adhesive bonding forms a seal that is less than fully intact.

In an embodiment of the above aspects of the invention, the support frame has a port positioned on the top.

In an embodiment of the above aspects of the invention, one or more devices are connected to form a row of the devices. In an embodiment, the one or more devices are connected by the support frames of the one or more devices being integrated with each other.

In an embodiment of the above aspects of the invention, the support frame is substantially chemically inert. In an embodiment of the above aspects of the invention, the support frame is electrically resistive.

In various embodiments of the above aspects of the invention, the support frame is comprised of plastic or rubber. In various embodiments of the above aspects of the invention, the support frame is comprised of polyethylene, polytetrafluoroethylene, polypropylene, polystyrene, polycarbonate, or nylon.

In an embodiment of the above aspects of the invention, the aperture membrane is substantially chemically inert. In an embodiment of the above aspects of the invention, the aperture membrane is electrically resistive. In various embodiments of the above aspects of the invention, the aperture membrane is comprised of plastic or rubber. In various embodiments of the above aspects of the invention, the aperture membrane is comprised of polyethylene, polytetrafluoroethylene, polypropylene, polystyrene, polycarbonate, or nylon.

In an embodiment of the above aspects of the invention, the first side and the second side of the support frame are tapered from the second open area toward the first open area.

In an embodiment of the above aspects of the invention, the shape of the support frame is configured to fit within an extraction well of an electrophoretic gel.

In an embodiment of the above aspects of the invention, the support frame has a U shape.

In an embodiment of the above aspects of the invention, wherein the macromolecule-permeable membrane is comprised of cellulose acetate.

In an embodiment of the above aspects of the invention, recovery membrane is compatible with electroelution.

In various embodiments of the above aspects of the invention, the recovery membrane is comprised of nitrocellulose, PVDF, dialysis tubing, or DEAE ion exchange resin.

In various embodiments of the above aspects of the invention, the through-hole of the aperture membrane has a circular, square, rectangular, or rhomboid shape. In an embodiment, the through-hole of the aperture membrane has a circular shape. In an embodiment, the circular through-hole of the aperture membrane has a diameter of at least 1 mm. In an embodiment, the circular through-hole of the aperture membrane has a diameter of about 2.4 mm.

In an embodiment of the above aspects of the invention, the one or more press-fit inserts is substantially chemically inert. In an embodiment of the above aspects of the invention, the one or more press-fit inserts is substantially electrically resistive.

In various embodiments of the above aspects of the invention, the one or more press-fit inserts is comprised of plastic or rubber. In various embodiments of the above aspects of the invention, the one or more press-fit inserts is comprised of polyethylene, polytetrafluoroethylene, polypropylene, polystyrene, polycarbonate, or nylon.

In various embodiments of the above aspects of the invention, the macromolecule is DNA, RNA, protein, or a combination thereof. In an embodiment, the macromolecule is DNA. In various embodiments, the macromolecule is single-stranded DNA or double-stranded DNA.

In an aspect there is provided a method for manufacturing the device of the above aspects of the invention, the method comprising: providing a substantially electrically resistive support frame having a top, a bottom, and two sides, defining a first open area and a second open area, the second open area positioned opposite to the first open area; covering the second open area of the support frame, with an aperture membrane, the aperture membrane having a through-hole positioned in a central area of the aperture membrane; and positioning a recovery membrane adjacent to the aperture membrane to cover the through-hole of the aperture membrane.

In an embodiment, the method further comprises positioning a macromolecule-permeable membrane proximal to the first open area of the support frame to separate the first open area of the support frame from the second open area of the support frame. In an embodiment, positioning the recovery membrane adjacent to the aperture membrane to cover the through-hole of the aperture membrane comprises positioning the recovery membrane between the aperture membrane and the macromolecule-permeable membrane.

In an embodiment, covering the second open area of the support frame, with an aperture membrane occurs by integrating the aperture membrane into the support frame.

In an embodiment, the method further comprises pressurably sealing the macromolecule-permeable membrane between the first open area of the support frame and the second open area of the support frame using one or more press-fit pieces.

In an embodiment, the method further comprises pressurably sealing the recovery membrane against the aperture membrane using one or more press-fit pieces. In an embodiment, the one or more press-fit pieces is a press-fit insert configured for positioning within the chamber and for pressurably sealing the recovery membrane against the aperture membrane. In an embodiment, the one or more press-fit pieces is a press-fit retainer configured for positioning within the first open area of the support frame and for pressurably sealing the macromolecule-permeable membrane between the press-fit insert and the press-fit retainer.

In an embodiment, the method further comprises sealing the macromolecule-permeable membrane to the support frame using adhesive bonding.

In an embodiment, the method further comprises sealing the recovery membrane to the support frame using adhesive bonding. In an embodiment, the method further comprises sealing the recovery membrane to the aperture membrane using adhesive bonding. In an embodiment, the adhesive bonding forms a seal that is fully intact. In an embodiment, the adhesive bonding forms a seal that is less than fully intact.

In an aspect, there is provided a method of capturing one or more macromolecules from an electrophoretic gel having the device of any one of the above aspects of the invention, positioned in an extraction well of a laneway of the electrophoretic gel, the one or more macromolecules positioned upstream of the device, the electrophoretic gel operationally positioned in an electrophoretic apparatus, the method comprising: applying an electric field to the electrophoretic gel to move the one or more macromolecules along the laneway of the electrophoretic gel toward the device; constricting lines of the electric field passing through the device by directing the lines through the through-hole of the aperture membrane, to reduce the cross-sectional area through which the one or more macromolecules move; and capturing the one or more macromolecules on the recovery membrane, thereby decreasing the surface area of the recovery membrane onto which the one or more macromolecules are captured.

In an embodiment, the constriction of the lines of the electric field occurs while maintaining the linearity of the lines of the electric field in the electrophoretic gel.

In an embodiment, the surface area of the recovery membrane on which the one or more macromolecules is captured is substantially the same as the surface area of the through-hole of the aperture membrane. In another embodiment, the surface area of the recovery membrane on which the one or more macromolecules is captured is larger than the surface area of the through-hole of the aperture membrane. In an embodiment, the surface area of the recovery membrane on which the one or more macromolecules is captured is the same as the second open area of the support frame.

In an embodiment, the method further comprises recovering the one or more macromolecules captured on the recovery membrane. In an embodiment, the recovering comprises re-suspending the one or more macromolecules captured on the recovery membrane in a buffer, wherein the volume of the buffer is smaller than, or equal to, the volume of the chamber of the device.

In various embodiments, the macromolecule is DNA, RNA, protein, or a combination thereof. In an embodiment, the macromolecule is DNA. In various embodiments, the macromolecule is single-stranded DNA or double-stranded DNA.

In an embodiment, the electrophoretic gel is an agarose gel.

In an embodiment, the electrophoretic gel is a polyacrylamide gel.

In an embodiment, operation of the electrophoretic apparatus is automated.

In an embodiment, the electrophoretic apparatus is operated using a robotic arm

Other features and advantages of the disclosure will be apparent from the following detailed description.

BRIEF DESCRIPTION OF THE DRAWINGS

The features and advantages of the disclosure will become more apparent in the following detailed description in which reference is made to the appended drawings wherein.

DETAILED DESCRIPTION OF THE DISCLOSURE

The inventors have invented a device and method for recovering one or more macromolecules from an electrophoretic gel, and methods for manufacturing and using the device. The device is an in-channel filtration device with a field constricting through-hole.

The terminology used herein is for the purpose of describing particular embodiments only and is not intended to be limiting of example embodiments of the invention. Unless defined otherwise, all technical and scientific terms used herein generally have the same meaning as commonly understood by one of ordinary skill in the art to which this disclosure belongs.

Device

The invention will be described below relative to certain illustrative embodiments. The components and methods of making and using the device are not limited to the illustrative embodiments described below.

As described herein, the inventors have provided a device for capturing and, optionally, recovering one or more macromolecules from an electrophoretic gel.

Figure 1:
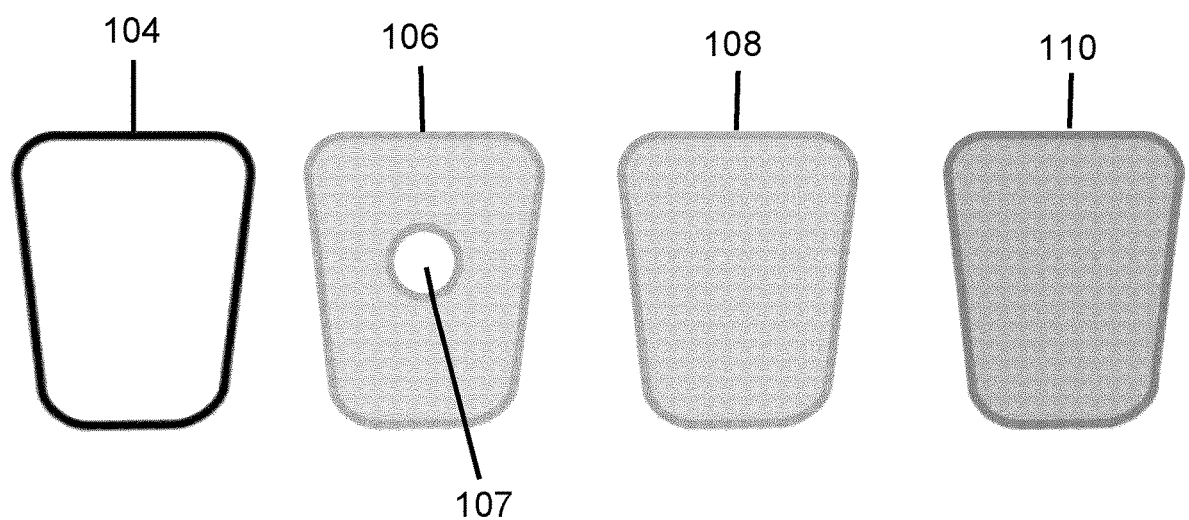
FIG. 1 is a front view of some of the individual components of an embodiment of the device of the disclosure.

Referring to FIG. 1, the device comprises a support frame 104. The support frame 104 has a top, a bottom, a first side and a second side which define a first open area and a second open area. The second open area is positioned opposite the first open area.

As used herein, "macromolecule" means any molecule that can be electrophoresed through an electrophoretic gel and can potential be recovered. Macromolecules include, deoxyribonucleic acids (DNA) (both double-stranded and single-stranded) and DNA fragments, ribonucleic acids (RNA) and RNA fragments, proteins and polypeptides and protein and polypeptide fragments. In an embodiment, the macromolecule is DNA.

In an embodiment, the support frame 104 is substantially electrically resistive. As used herein, "substantially electrically resistive" means resisting the flow of electric current through a material (e.g., through a support frame). The resistivity of a support frame 104 of the present disclosure may result in, for example, the conductivity of the frame being near negligible relative to that of the electrophoretic gel and/or buffer. In an embodiment, the support is electrically resistive. In an embodiment, the support frame 104 is substantially chemically inert, meaning that it does not react with other chemical with which it comes into contact. In an embodiment, the support frame 104 is comprised of plastic, for example, a semi-flexible, non-porous plastic, or rubber. The support frame 104 can be comprised of, for example, polyethylene, polytetrafluoroethylene, polypropylene, polystyrene, polycarbonate, nylon or combinations thereof. In an embodiment, the entirety or a portion of the surface of the frame can be treated with suitable treatment that would confer a hydrophobic nature to the device. Examples of such treatments include, but are not limited to, Aculon NanoProof.

In an embodiment, the shape of the support frame 104 is configured to fit within an extraction well of an electrophoretic gel. In one embodiment the shape of the support frame 104 is configured to form a seal with the inner lining of the cassette channel. In an embodiment, the support frame 104 has a U shape. The inner lining of the support cassette channel is comprised of materials know to those skilled in the art, and may be, for example, comprised of polycarbonate.

Referring again to FIG. 1, the device also comprises an aperture membrane 106 having a through-hole 107 positioned in a central area. The aperture membrane 106 is configured to cover the second open area of the support frame 104. The size and shape of the through-hole 107 can vary, provided that it is configured to have a surface area that is less than the surface area defined by the dimensions of the support frame 104 (i.e., the first or second open areas) or defined by the cross-sectional area of the electrophoretic gel. This configuration constricts the field lines running through the gel down to that of the through-hole 107. This prevents macromolecules from becoming entrapped in crevices of the device or from being driven by aberrant electric field lines in a manner that causes the macromolecules to leak past the aperture membrane 106.

In an embodiment, the through-hole 107 of the aperture membrane 106 has a circular, square, rectangular, or rhomboid shape. In one embodiment, the through-hole 107 is circular in shape. In another embodiment, the through-hole 107 of the aperture membrane 106 has a diameter of at least 1 mm. In another embodiment, the through-hole 107 of the aperture membrane 106 has a diameter of about 2.4 mm.

In an embodiment, the aperture membrane 106 is substantially electrically resistive. In another embodiment, the aperture membrane 106 is electrically resistive. In an embodiment, the aperture membrane 106 is substantially chemically inert. The aperture membrane 106 may be comprised of plastic, for example, a pliable or hard plastic, or rubber. For example, the aperture membrane 106 may be comprised of polyethylene, polytetrafluoroethylene, polypropylene, polystyrene, polycarbonate, nylon or combinations thereof. In an embodiment the aperture membrane 106 is comprised of the same material as the support frame 104.

Referring again to FIG. 1, the device also comprises a recovery membrane 108 positioned adjacent to the aperture membrane 106 and configured to cover the through-hole 107 of the aperture membrane 106. In an embodiment, the recovery membrane 108 is compatible with electroelution (e.g., is made of a material that allows for electroelution). The recovery membrane 108 may be comprised of, for example, nitrocellulose, PVDF, dialysis tubing, or DEAE ion exchange resin. In an embodiment, the recovery membrane 108 is SpectraPor1.

As shown in FIG. 1, in an embodiment, the device further comprises a macromolecule-permeable membrane 110 configured to separate the first open area of the support frame 104 from the second open area of the support frame 104, and is positioned proximal to the first open area of the support frame 104.

In an embodiment, the macromolecule-permeable membrane 110 is comprised of cellulose acetate.

Figure 2:
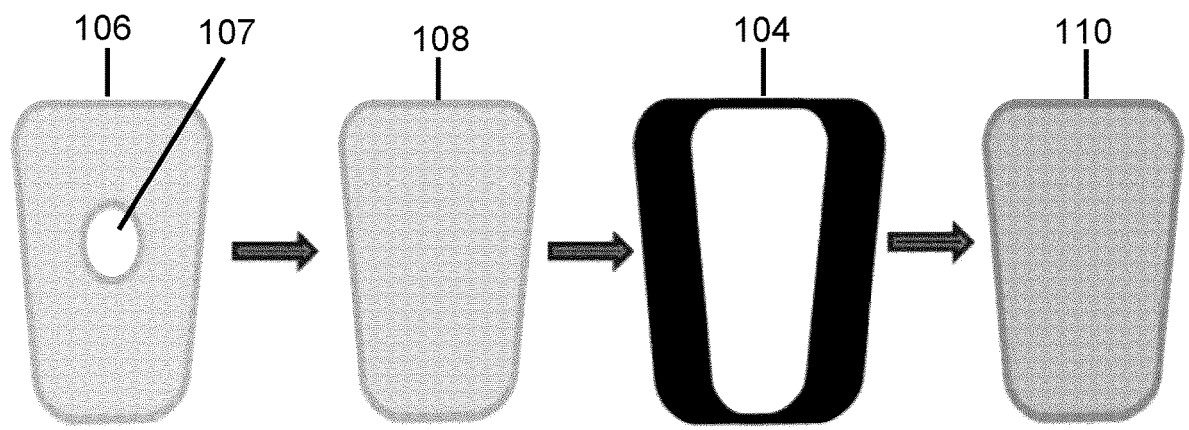
FIG. 2 schematic depicting the order in which the components of FIG. 1 may be assembled to make an embodiment of the device of the disclosure.
Figure 3:
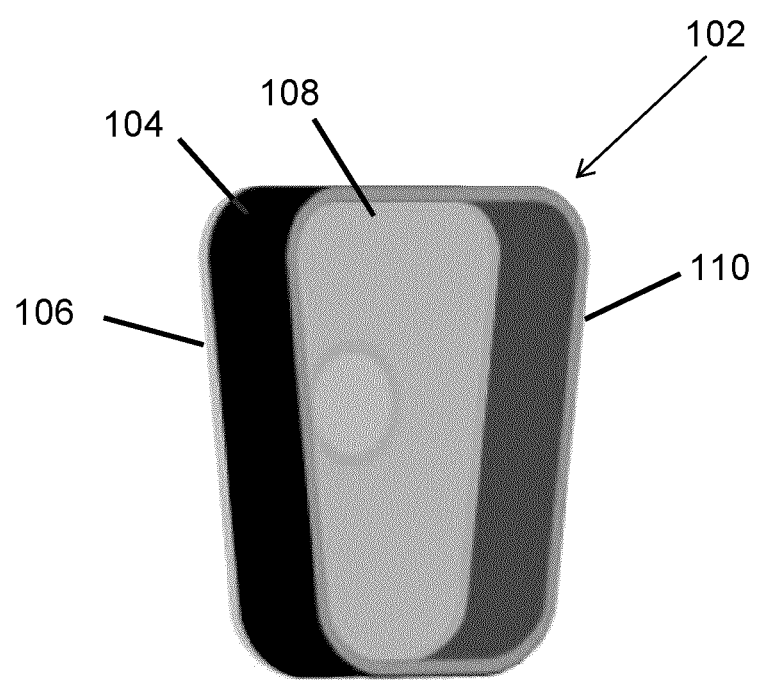
FIG. 3 is a perspective view of an embodiment of the assembled device of the disclosure comprising the components of FIG. 1.

Referring to FIG. 2, the order in which the aperture membrane 106 and the recovery membrane 108 are positioned to cover the second open area of the support frame 104 and in which the macromolecule-permeable membrane 110 is positioned to cover the first open area of the support frame 104 are shown. In this embodiment, and referring to FIG. 3, which shows an embodiment of the device 102 when assembled, the recovery membrane 108 is positioned adjacent to the aperture membrane 106 and the macromolecule-permeable membrane 110 (i.e., the recovery membrane 108 is positioned on the support frame 104 such that it is between the aperture membrane 106 and the macromolecule-permeable membrane 110). In such an embodiment, the device 102 may further comprise a chamber defined by the support frame 104, the macromolecule-permeable membrane 110, and the recovery membrane 108.

In another embodiment, the recovery membrane 108 is positioned on the opposite side of the aperture membrane 106 such that it is not adjacent to the second open area of the support frame 104 (i.e., the aperture membrane 106 is positioned on the support frame 104 such that it is between the recovery membrane 108 and the macromolecule-permeable membrane 110). In such an embodiment, the device 102 may further comprise a chamber defined by the support frame 104, the macromolecule-permeable membrane 110, and the aperture membrane 106.

The aperture membrane 106 may be configured to cover the second open area of the support frame 104 using any method known to the person skilled in the art. For example, the aperture membrane 106 may be sealed to or adhered to the support frame 104 using a bonding adhesive. In an embodiment, the bonding adhesive is resistant or impermeable to a liquid, for example, a buffer typically used during gel electrophoresis. In an embodiment, the adhesive bonding forms a seal that is fully intact. In an embodiment, the adhesive bonding forms a seal that is less than fully intact (i.e., the seal does not have to be fully intact in order for the advantages of the present invention to be realized).

In an embodiment, the aperture membrane 106 is built directly into or integrated into the support frame 104, such that the support frame 104 and the aperture membrane 106 form a combined unit.

The recovery membrane 108 may be configured to cover the through-hole 107 of the aperture open area of the support frame 104 using any method known to the person skilled in the art. For example, the recovery membrane 108 may be sealed to or adhered to the support frame 104 using a bonding adhesive. Alternatively or in addition, the recovery membrane 108 may be adhered to the aperture membrane 106. In an embodiment, the bonding adhesive is resistant or impermeable to a liquid, for example, a buffer typically used during gel electrophoresis. In an embodiment, the adhesive bonding forms a seal that is fully intact. In an embodiment, the adhesive bonding forms a seal that is less than fully intact (i.e., the seal does not have to be fully intact in order for the advantages of the present invention to be realized).

The macromolecule-permeable membrane 110 may be configured to separate the first open area of the support frame 104 from the second open area of the support frame 104 using any method known to the person skilled in the art. For example, the macromolecule-permeable membrane 110 may be sealed to or adhered to the support frame 104 using a bonding adhesive. In an embodiment, the bonding adhesive is resistant or impermeable to a liquid, for example, a buffer typically used during gel electrophoresis. In an embodiment, the adhesive bonding forms a seal that is fully intact. In an embodiment, the adhesive bonding forms a seal that is less than fully intact (i.e., the seal does not have to be fully intact in order for the advantages of the present invention to be realized).

Figure 4B:
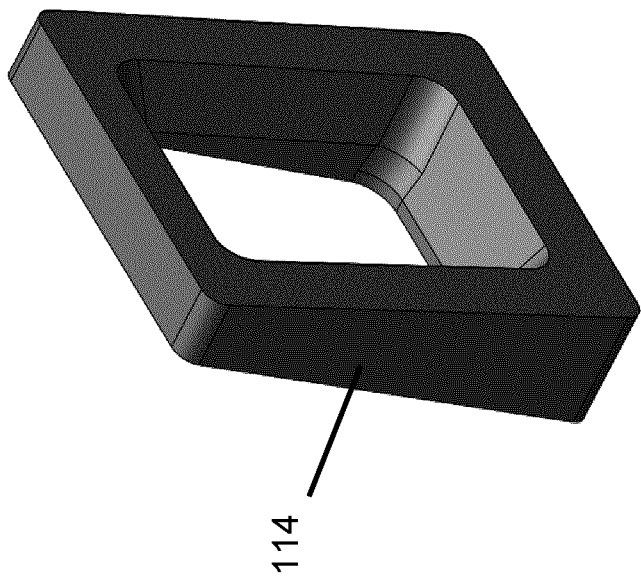
FIG. 4B is a perspective view of a press-fit retainer for use in an embodiment of the device of the disclosure.
Figure 4A:
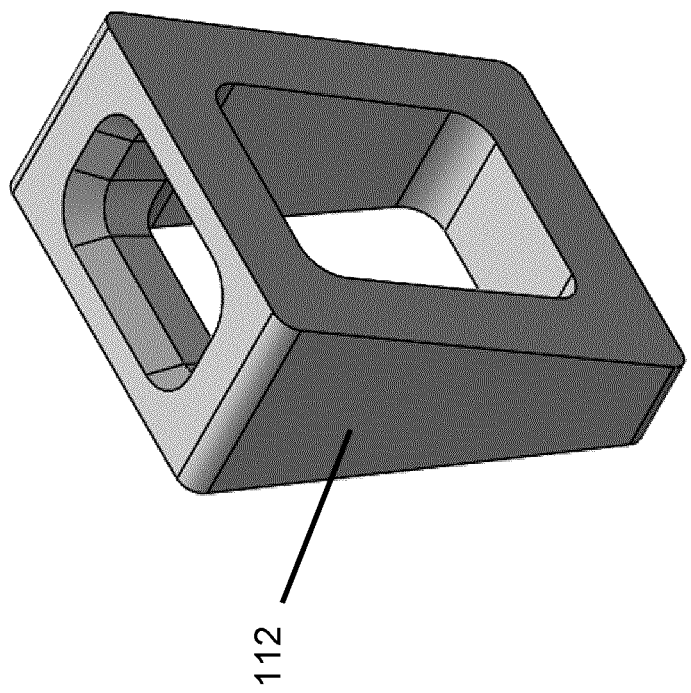
FIG. 4A is a perspective view of a press-fit insert for use in an embodiment of the device of the disclosure.

Referring to FIGS. 4A and 4B, in an embodiment, the device may further comprise one or more press-fit pieces configured to pressurably seal the macromolecule-permeable membrane between the first open area of the support frame and the second open area of the support frame. The device may also further comprise one or more press-fit pieces configured to pressurably seal the recovery membrane against the aperture membrane. For example as shown in the embodiment of FIG. 4A, the one or more press-fit pieces is a press-fit insert 112 configured for positioning within the chamber and for pressurably sealing the recovery membrane against the aperture membrane. As shown in the embodiment of FIG. 4B, the one or more substantially electrically resistive press-fit pieces is a press-fit retainer 114 configured for positioning within the first open area of the support frame and for pressurably sealing the macromolecule-permeable membrane between the press-fit insert 112 and the press-fit retainer 114. In an embodiment, the press-fit pieces, such as the press-fit insert 112 and the press-fit retainer 114 are substantially electrically resistive. In an embodiment, the press-fit pieces, such as the press-fit insert 112 and the press-fit retainer 114 are electrically resistive. In an embodiment, the press-fit pieces, such as the press-fit insert 112 and the press-fit retainer 114 are substantially chemically inert. The press-fit pieces, such as the press-fit insert 112 and the press-fit retainer 114 may be comprised of plastic or rubber. For example, the press-fit pieces, may be comprised of polyethylene, polytetrafluoroethylene, polypropylene, polystyrene, polycarbonate, nylon or combinations thereof. In an embodiment, the entirety or a portion of the surface of the press-fit insert 112 and/or the press-fit retainer 114 is treated with suitable treatment that would confer a hydrophobic nature to the device 102. Examples of such treatments include, but are not limited to, Aculon NanoProof.

Figure 5:
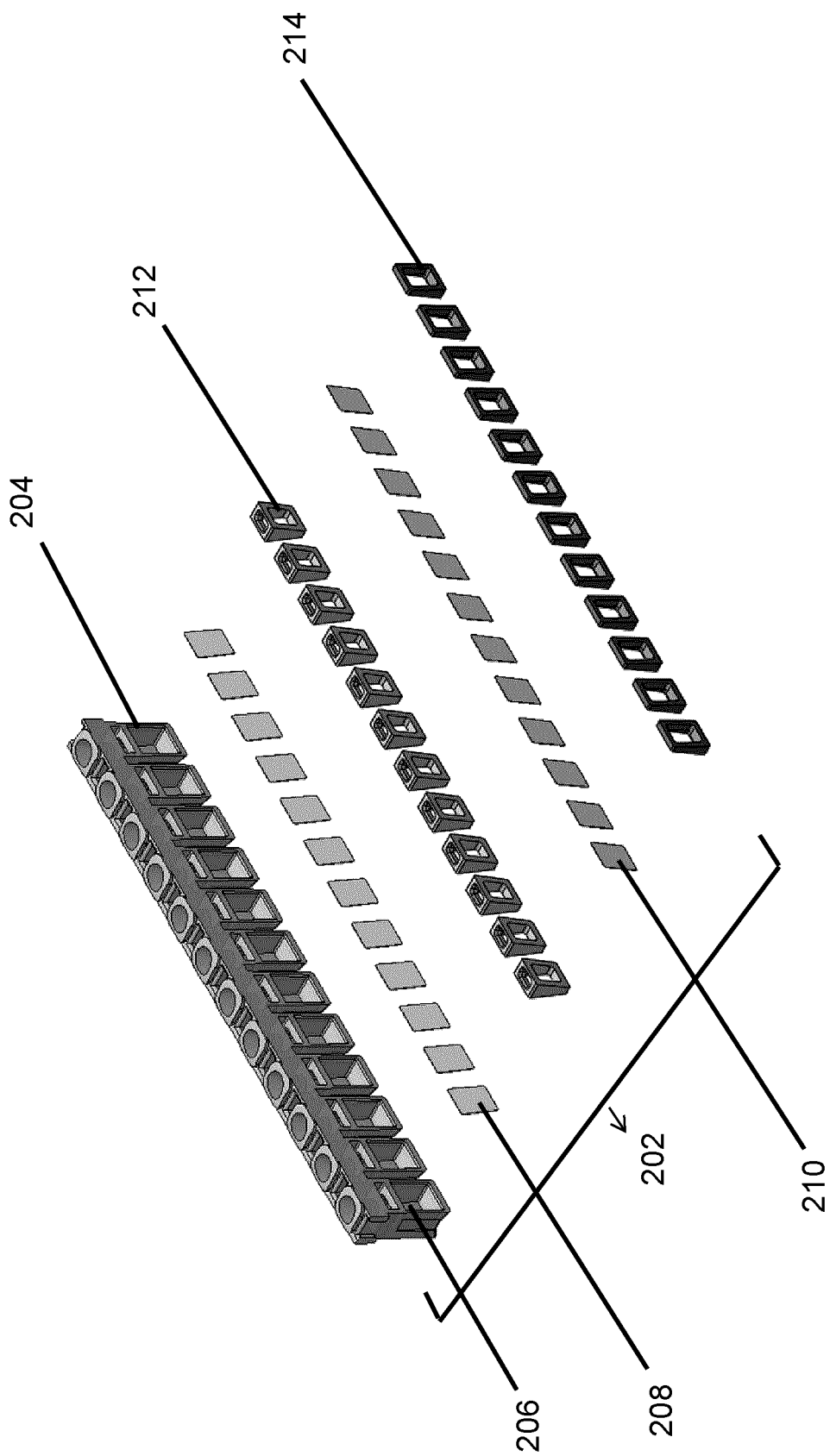
FIG. 5 is an exploded view of some of the individual components of an embodiment of the device of the disclosure, where multiple devices are connected in a row.

Referring to FIG. 5, multiple devices 202 of the present invention can be arranged in a row. In this embodiment, the support frame 204 has an integrated aperture membrane 206. The order in which the recovery membrane 208, press-fit insert 212, macromolecule-permeable membrane 210 and press-fit retainer 214 are positioned to comprise the device 202 are shown. The number of devices 202 in the row can correspond to the number of lanes in an electrophoretic device in which the device 202 is to be used to capture or recover macromolecules. The row of devices 202 can be connected, for example, by their support frames 204. In one embodiment, the support frames 204 are manufactured such that they are integrated with one another in a row.

Figure 6A:
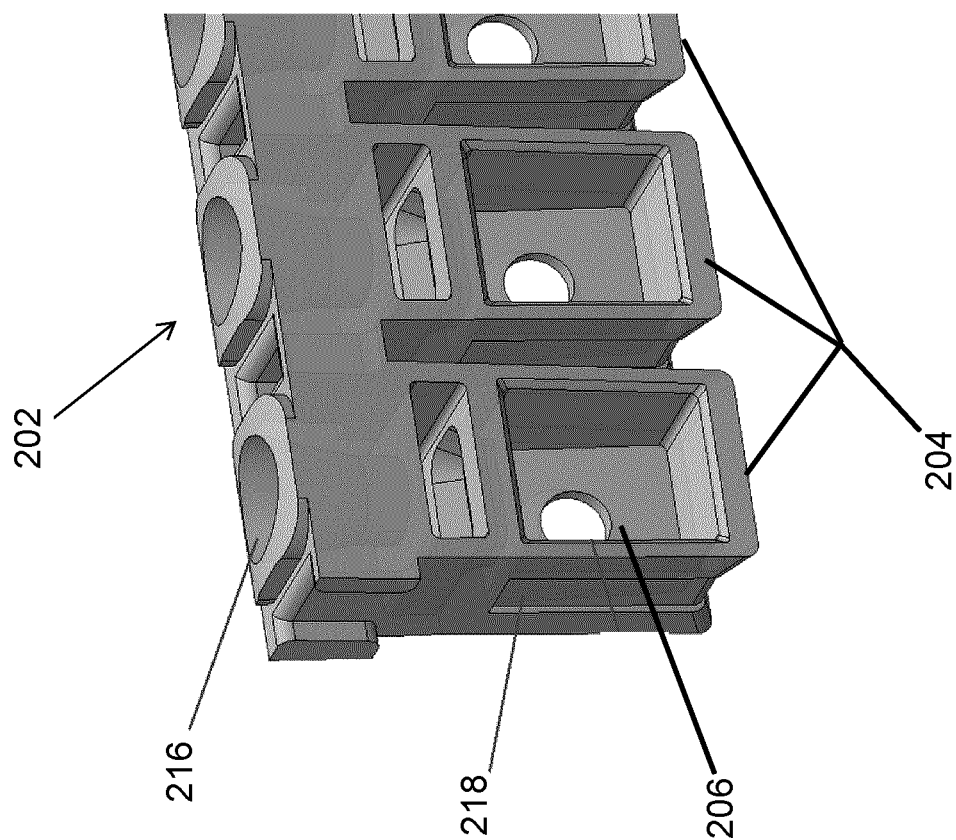
FIG. 6A depicts some of the individual components of an embodiment of the assembled device of the disclosure, where multiple devices are connected in a row and with the ports viewable through shading of the support structure.

FIG. 6A shows two support frames (and a partial third support frame) 204 connected together. In this embodiment, the aperture membrane 206 is integrated or built into the support frame 204. In addition, the support frame 204 of each device 202, regardless of whether each device 202 is used alone or is part of a row of devices 202, may have a port 216 positioned on the top. This port 216 allows access to the chamber (and to the contents of the chamber), for example, using a pipette tip. The port 216 can be any shape or size that permits access to the chamber.

Referring again to FIG. 6A, one or more of the devices 202 may also comprise one or more locating guides 218, positioned on the sides of the support frame 204. The locating guides 218 may be used to assist in securing the position of the support frame 204 when the device 202 is placed into a cassette of a gel electrophoretic device.

Figures 6B, 6C:
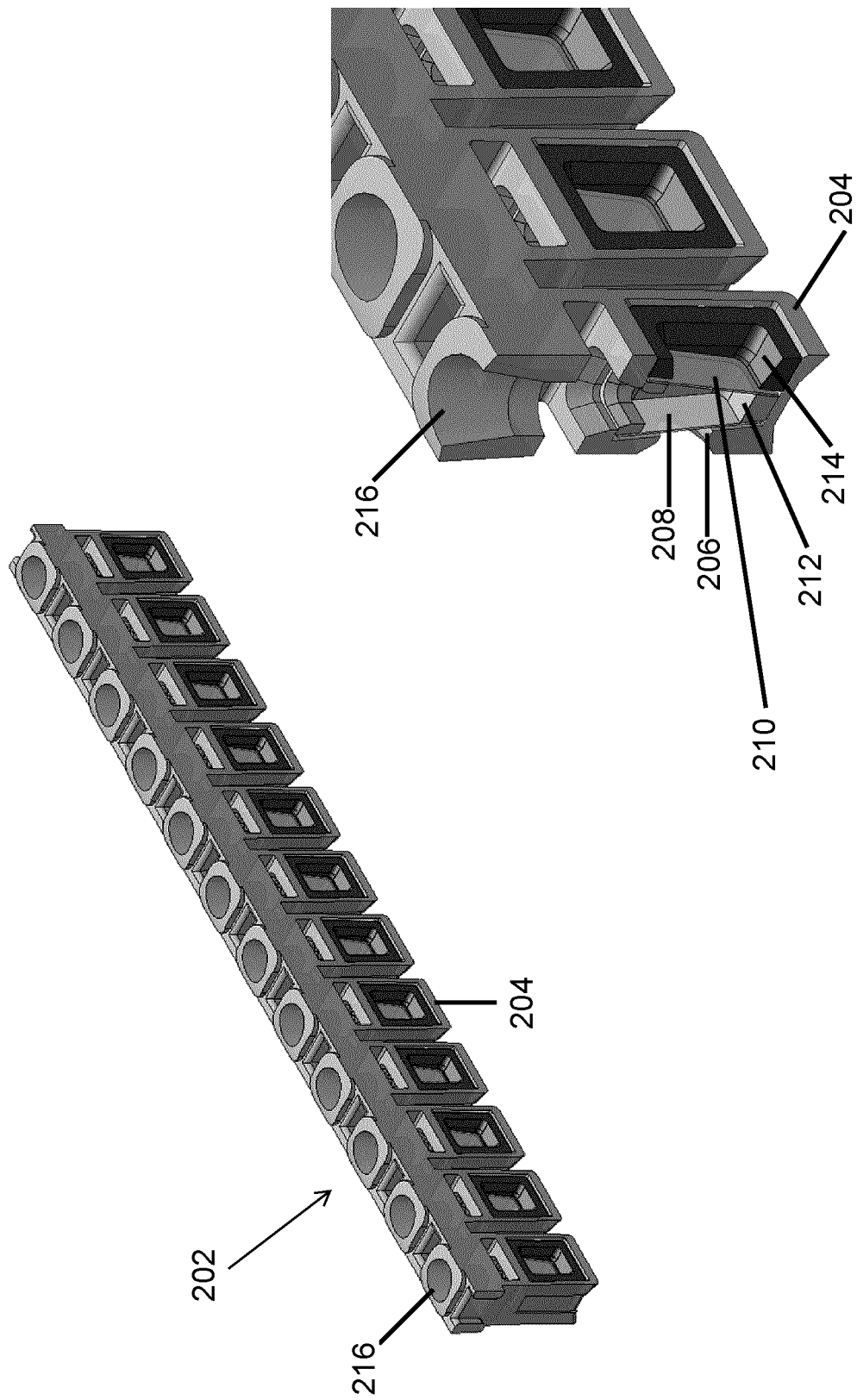
FIG. 6B is a perspective view of some of the individual components of an embodiment of the assembled device of the disclosure, where multiple devices are connected in a row and with the ports viewable through shading of the support structure.
FIG. 6C is an enlarged sectional view of a portion of some of the individual components of the embodiment of the assembled device of FIG. 6B, where multiple devices are connected in a row and with the ports viewable through shading of the support structure.

In FIG. 6B, a row of assembled devices 202 is shown. In this embodiment, the support frame 204 has ports 216 for access to the chamber. In FIG. 6C, the arrangement of the recovery membrane 208, press-fit insert 212, macromolecule-permeable membrane 210, press-fit retainer 214, and the support frame 204, having a port 216, of an embodiment of the device 202 of FIG. 6B are shown. In this embodiment, the aperture membrane 206 is integrated into the support frame 204.

Figure 7A:
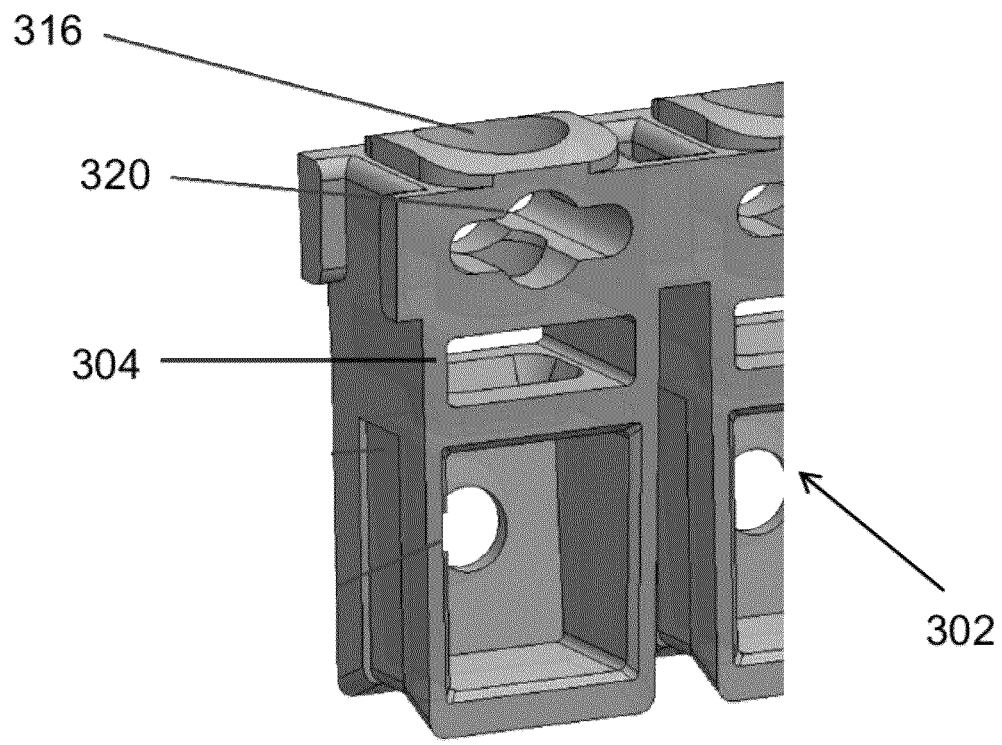
FIG. 7A is a perspective view of some of the individual components of a further embodiment of the assembled device of the disclosure, where multiple devices are connected in a row.

Referring to FIG. 7A, in an embodiment the device 302 includes a support frame 304 which further comprises a first recess 320 in the support frame 304 and a second recess in the support frame 304, the first recess 320 and the second recess are configured for engagement by a tool to move the device 302 from one location to another. In an embodiment, the first recess 320 and the second recess are positioned opposite of each other in the first and second sides, respectively, of the support frame 304, preferably near the top of the frame. In another embodiment, the first recess 320 and the second recess are configured (e.g., are connected to each other) to form a recess through-hole to permit at least a portion of the tool to pass through the support frame 304. The shape and size of the first recess 320 and the second recesses may be any that permit engagement by the tool, for example, a robotic or automated arm used to move the device 302. The shape and size of the recess through-hole may be any that permits engagement by the tool, including, a robotic or automated arm used to move the device 302.

Figures 7B, 7C:
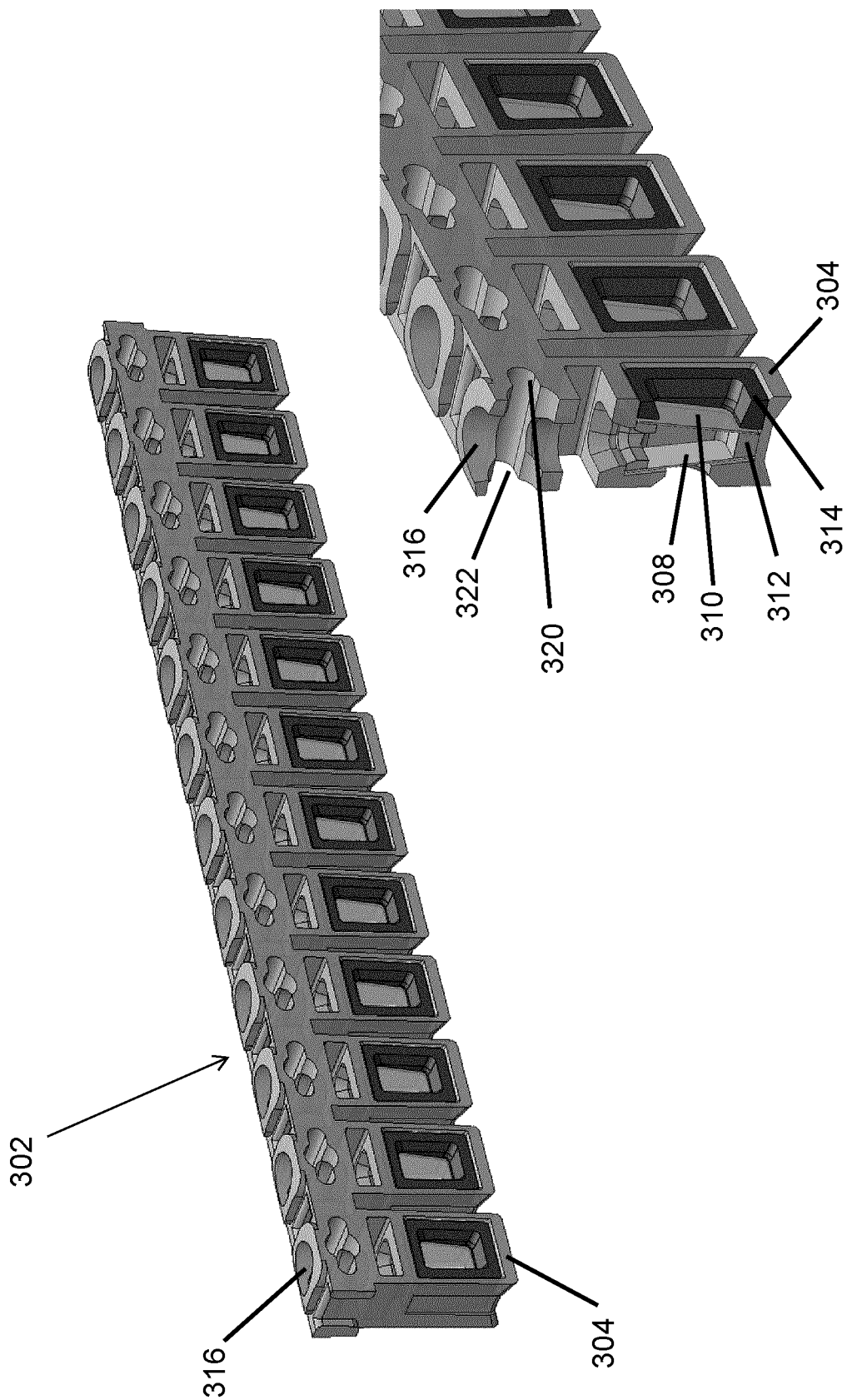
FIG. 7B is a perspective view of some of the individual components of a further embodiment of the assembled device of the disclosure, where multiple devices are connected in a row.
FIG. 7C is an enlarged sectional view of a portion of some of the individual components of the embodiment of the assembled device of FIG. 7B, where multiple devices are connected in a row.

Referring to FIG. 7B, a row of assembled devices 302 is shown. In this embodiment, the support frame 304 has ports 316 to access the chamber as well as a first recess 320 and a second recesses forming a recess through-hole permitting a tool to pass through the support frame 304 to move the device 302 or row of devices 302. When one or more of the devices 302 are connected in a row, one or more of the devices 302 may have the first recess 320 and the second recess, which will then permit the entire row to be moved, while other devices 302 in the row may not have the recesses. In FIG. 7C, the arrangement of the recovery membrane 308, press-fit insert 312, macromolecule-permeable membrane 310, press-fit retainer 314, and the support frame 304, having a port 316 and a first recess 320 and a second recesses 322 forming a recess through-hole, of an embodiment of the device 302 of FIG. 7B are shown. In this embodiment, the aperture membrane is integrated into the support frame 304.

Figure 8:
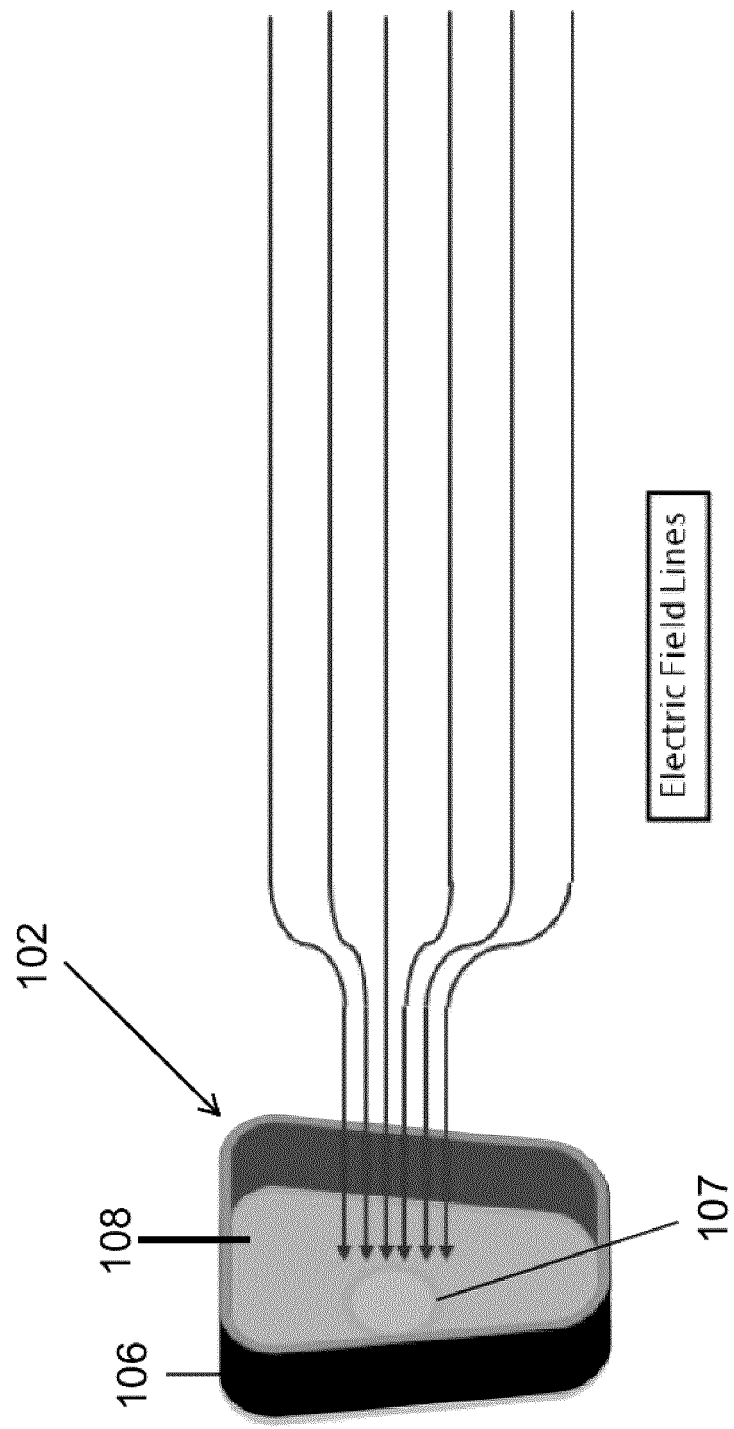
FIG. 8 is a schematic depicting the convergence of electric field lines in order to pass through the through-hole of the aperture membrane of an embodiment of the device.

The device 102 can be used with gel electrophoretic devices to filter macromolecules in a laneway (i.e., in-channel) of the gel. The device 102 can be positioned in a laneway of an electrophoretic device such that the first open area of the frame is facing toward the macromolecules being run through the gel. In one embodiment, the device 102 is used with the Ranger Technology (Coastal Genomics). Referring to FIG. 8, the device 102 can funnel electric field lines that are incoming through the macromolecule-permeable membrane 110 (if present) in the particular embodiment of the device 108 used through the through-hole 107 of the aperture membrane 106, which concentrates all macromolecules onto a relatively smaller surface area of the recovery membrane 108 (which in this embodiment is positioned on the support frame 104 such that it is between the aperture membrane 106 and the macromolecule-permeable membrane 110 (if present)) compared to when the device 102 is not used. The device 102, by directing all electric field lines through to a central area of the recovery membrane 108, significantly decreases or eliminates altogether, the opportunity for field lines to find any conduits around the recovery membrane 108, compared to devices in which the membranes are not perfectly sealed. This result in improved recovery of macromolecules on the recovery membrane 108, compared to recovery processes that do not use the device 102.

Figure 9:
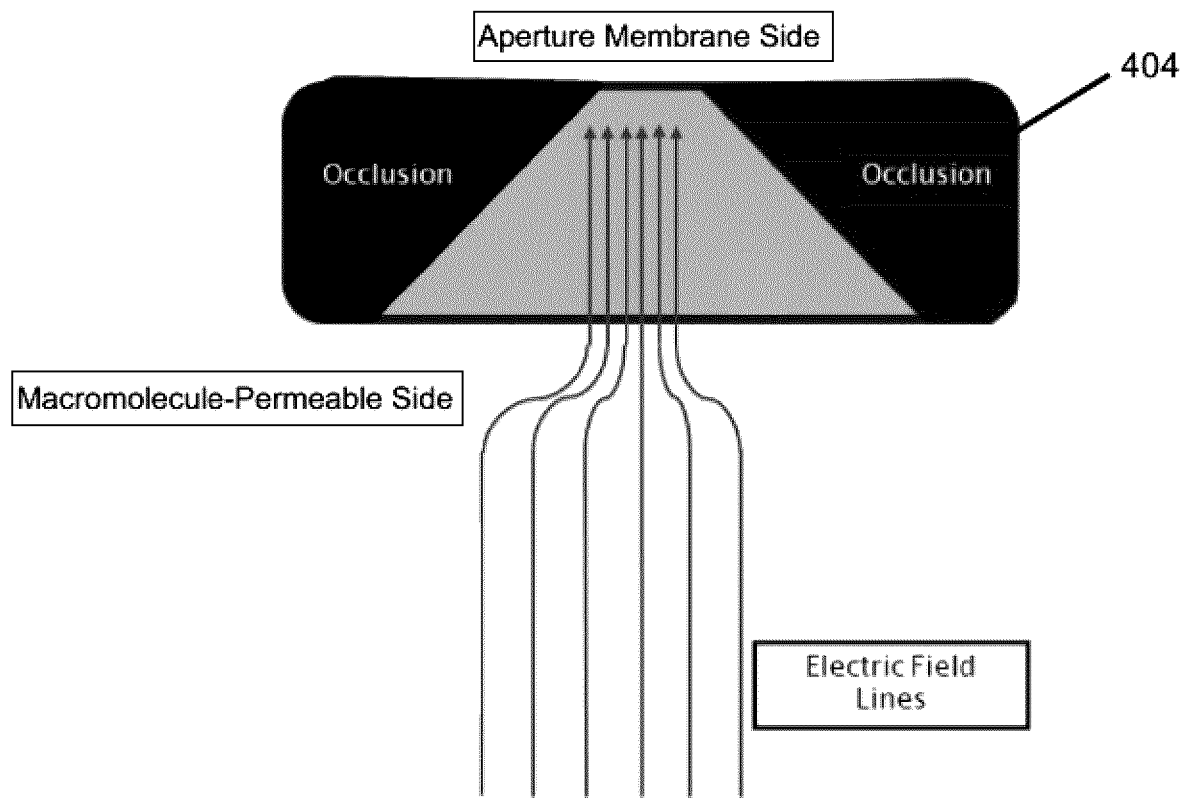
FIG. 9 shows a top plan view of an embodiment of the device, further comprising a partial occlusion of the chamber.

In addition, since the electric field lines direct the macromolecules to a nominal surface on the recovery membrane 108, the volume of buffer (e.g., elution buffer) in the chamber can be reduced by occluding any chamber volume that is not traversed by the narrowing electric field lines. For example, as shown in FIG. 9, the volume of the chamber can be reduced by using a support frame 404 in which the first and second sides of the support frame 404 are occluded, for example, tapered (from the second open area toward the first open area (i.e., such that area defined by the first open area is larger than the surface area defined by the second open area).

The device 102 can be used to capture and/or recover one or more macromolecules. In one embodiment the macromolecule is DNA, RNA, protein, or a combination thereof. In another embodiment the macromolecule is DNA. The macromolecule may be single-stranded DNA or double-stranded DNA. The device can be used for nearly any size of DNA, subject to the molecular weight cut-off (MWCO) of the recovery membranes 108, below which small macromolecules are not recovered. In an embodiment, the DNA is between 10 bases and 20 kilobases, or between 100 bases and 1 kilobases; between 10 bases and 100 bases or greater than 30 bases.

Methods for Manufacturing the Device

A method for manufacturing the device disclosed herein is also provided. The method comprises 1) providing a substantially electrically resistive support frame having a top, a bottom, and two sides, defining a first open area and a second open area, the second open area positioned opposite to the first open area; 2) covering the second open area of the support frame, with an aperture membrane, the aperture membrane having a through-hole positioned in a central area of the aperture membrane; and 3) positioning a recovery membrane adjacent to the aperture membrane to cover the through-hole of the aperture membrane.

In one embodiment, the method comprises positioning a macromolecule-permeable membrane proximal to the first open area of the support frame to separate the first open area of the support frame from the second open area of the support frame. In one embodiment, positioning the recovery membrane adjacent to the aperture membrane to cover the through-hole of the aperture membrane comprises positioning the recovery membrane between the aperture membrane and the macromolecule-permeable membrane. In another embodiment, covering the second open area of the support frame, with an aperture membrane occurs by integrating the aperture membrane into the support frame.

In an embodiment, the method further comprising pressurably sealing the macromolecule-permeable membrane between the first open area of the support frame and the second open area of the support frame using one or more press-fit pieces. In another embodiment, the method further comprises pressurably sealing the recovery membrane against the aperture membrane using one or more press-fit pieces. The press-fit pieces may be substantially electrically resistive. For example, the press-fit piece can be is a press-fit insert configured for positioning within the chamber and for pressurably sealing the recovery membrane against the aperture membrane. The press-fit piece can be a press-fit retainer configured for positioning within the first open area of the support frame and for pressurably sealing the macromolecule-permeable membrane between the press-fit insert and the press-fit retainer.

In an embodiment, the method further comprises sealing the macromolecule-permeable membrane to the support frame using adhesive bonding; sealing the recovery membrane to the support frame using adhesive bonding; and/or sealing the recovery membrane to the aperture membrane using adhesive bonding. The adhesive bonding between any or all of these membranes can form a seal that is fully intact or that is less than fully intact. A seal that is less than fully intact can still provide the advantages of the invention, because the electric field lines that are incoming to the aperture of the device are funneled and concentrated on a small surface area of the recovery membrane.

Methods of Capturing Macromolecules

A method of capturing one or more macromolecules from an electrophoretic gel having or containing the device disclosed herein positioned in an extraction well of a laneway of the electrophoretic gel is also provided. In this method, the one or more macromolecules are positioned upstream of the device and the electrophoretic gel is operationally positioned in an electrophoretic apparatus. As used herein "upstream" means positioned between a loading well in the laneway of the electrophoretic gel and the device. The one or more macromolecules may also be positioned in the loading well of the electrophoretic device and be "upstream" of the device. The device is positioned in the laneway when the target macromolecules have been electrophoresed through the gel to the extraction point in the gel. The device can be inserted into the gel at the extraction point manually or by automated machinery.

An electric field is applied to the electrophoretic gel to move the one or more macromolecules along the laneway of the electrophoretic gel toward the device. The lines of the electric field are constricted as they pass through the device because the lines of the electric field are directed through the through-hole of the aperture membrane. This reduces the cross-sectional area through which the one or more macromolecules move. The one or more macromolecules are then captured on a decreased surface area of the recovery membrane.

In an embodiment, the constricting the lines of the electric field occurs while maintaining the linearity of the lines of the electric field in the electrophoretic gel. Maintenance of linear field lines in the electrophoretic gel encourages uniformity in migration of molecules of similar size, and is imperative to preserve the resolution of macromolecules (for example, DNA fragments) of different sizes. With respect to nucleic acid fragments, such a DNA fragments, a decrease in resolution results in co-migration fragments of variable size, which would negatively impact the advantages of performing gel electrophoresis.

In one embodiment, the surface area of the recovery membrane on which the one or more macromolecules is captured is substantially the same as the surface area of the through-hole of the aperture membrane.

In another embodiment, the method further comprises recovering the one or more macromolecules captured on the recovery membrane. In one embodiment the one or more macromolecules captured on the recovery membrane are recovered while the device is in the electrophoretic gel. In one embodiment the one or more macromolecules captured on the recovery membrane are recovered after the device is removed from the electrophoretic gel. In this embodiment, the device containing the macromolecules to be recovered is removed from the gel and maintained intact.

Recovery of the one or more macromolecules may comprise re-suspending the one or more macromolecules captured on the recovery membrane in a buffer, for example, an elution buffer, wherein the volume of the buffer is smaller than, or equal to, the volume of the chamber of the device. Suitable elution buffers are known to those skilled in the art. The buffers can be inserted into the chamber of the device through the port positioned in the top of the support frame.

Once the one or more macromolecules are eluted, they can be extracted from the device, for example, by aspiration through the port.

In an embodiment, wherein the macromolecule is DNA, RNA, protein, or a combination thereof. In a preferred embodiment, the macromolecule is DNA. In an embodiment, the macromolecule is single-stranded DNA or double-stranded DNA.

In other embodiments, the electrophoretic gel is an agarose gel. In another embodiment, the electrophoretic gel is a polyacrylamide gel. In another embodiment the operation of the electrophoretic apparatus is automated, for example, using a robotic arm.

In an embodiment the device of the disclosure is used with technologies that provide scalable and/or fully automated gel electrophoresis (e.g., assay plate set up, pipette tip loading, sample load, pipette tip ejection, electrophoresis initiation, image capturing, gel documentation, recovery of target molecules and analysis of those molecules) of one or many (e.g., 48, 96) samples that allow for size selection of desired macromolecules, such as DNA, RNA and proteins. In an embodiment, the device of the present disclosure is used with Ranger Technology.

Although the disclosure has been described with reference to certain specific embodiments, various modifications thereof will be apparent to those skilled in the art. Any examples provided herein are included solely for the purpose of illustrating the disclosure and are not intended to limit the disclosure in any way. Any drawings provided herein are solely for the purpose of illustrating various aspects of the disclosure and are not intended to be drawn to scale or to limit the disclosure in any way. The scope of the claims appended hereto should not be limited by the preferred embodiments set forth in the above description, but should be given the broadest interpretation consistent with the present specification as a whole. The disclosures of all prior art recited herein are incorporated herein by reference in their entirety.

We claim:

1. A device for capturing one or more macromolecules from an electrophoretic gel, the device comprising:
   a. a substantially electrically resistive support frame having a top, a bottom, a first side and a second side, defining a first open area and a second open area, the second open area positioned opposite the first open area; the support frame configured to fit into a laneway or an extraction well of the electrophoretic gel;
   b. a substantially electrically resistive aperture membrane having a through-hole positioned in a central area, the aperture membrane covering the second open area of the support frame and the through-hole having a surface area that is less than the surface area defined by the dimensions of the support frame or defined by the cross-sectional area of the electrophoretic gel; and
   c. a recovery membrane positioned adjacent to the aperture membrane and covering the through-hole of the aperture membrane, the recovery membrane having a surface area that is perpendicular to the direction of an electric field applied to the electrophoretic gel.

2. The device of claim 1, further comprising a macromolecule-permeable membrane separating the first open area of the support frame from the second open area of the support frame, and positioned proximal to the first open area of the support frame.

3. The device of claim 2, wherein the recovery membrane is positioned between the aperture membrane and the macromolecule-permeable membrane.

4. The device of claim 3, further comprising a chamber defined by the support frame, the macromolecule-permeable membrane, and the recovery membrane.

5. The device of claim 4, wherein the aperture membrane is integrated into the support frame.

6. The device of claim 4, further comprising:
a. one or more press-fit pieces configured to pressurably seal the macromolecule-permeable membrane between the first open area of the support frame and the second open area of the support frame; or
b. one or more press-fit pieces configured to pressurably seal the recovery membrane against the aperture membrane.

7. The device of claim 6, wherein the one or more press fit pieces is:
a. substantially chemically inert;
b. substantially electrically resistive;
c. comprised of plastic or rubber; and/or
d. comprised of polyethylene, polytetrafluoroethylene, polypropylene, polystyrene, polycarbonate, or nylon.

8. The device of claim 2, wherein the macromolecule-permeable membrane is comprised of cellulose acetate.

9. The device of claim 1, wherein:
a. the recovery membrane is sealed to the support frame using adhesive bonding; or
b. the recovery membrane is sealed to the aperture membrane using adhesive bonding.

10. The device of claim 9, wherein:
a. the adhesive bonding forms a seal that is fully intact; or
b. the adhesive bonding forms a seal that is less than fully intact.

11. The device of claim 1, wherein the support frame has a port positioned on the top.

12. The device of claim 1, further comprising one or more device of claim 1 connected to each other to form a row of devices.

13. The device of claim 1, wherein the support frame is:
a. substantially chemically inert;
b. electrically resistive;
c. comprised of plastic or rubber; and/or
d. comprised of polyethylene, polytetrafluoroethylene, polypropylene, polystyrene, polycarbonate, or nylon.

14. The device of claim 1, wherein the aperture membrane is:
a. substantially chemically inert;
b. electrically resistive;
c. comprised of plastic or rubber; and/or
d. comprised of polyethylene, polytetrafluoroethylene, polypropylene, polystyrene, polycarbonate, or nylon.

15. The device of claim 1, wherein the shape of the support frame is configured to fit within the extraction well of the electrophoretic gel.

16. The device of claim 1, wherein the recovery membrane is compatible with electroelution.

17. The device of claim 1, wherein the recovery membrane is comprised of nitrocellulose, polyvinylidene fluoride (PVDF), dialysis tubing, or diethylaminoethyl (DEAE) ion exchange resin.

18. The device of claim 1, wherein the macromolecule is DNA, RNA, protein, or a combination thereof.

19. A method of capturing one or more macromolecules from an electrophoretic gel, the method comprising:
a. providing the device of claim 1, positioned in a laneway or an extraction well of the electrophoretic gel, the one or more macromolecules positioned upstream of the device, the electrophoretic gel operationally positioned in an electrophoretic apparatus;
b. applying an electric field to the electrophoretic gel to move the one or more macromolecules along the laneway of the electrophoretic gel toward the device;
c. constricting lines of the electric field passing through the device by directing the lines through the through-hole of the aperture membrane of the device, to reduce the cross-sectional area through which the one or more macromolecules move; and
d. continuing to apply the electric field to the gel to capture the one or more macromolecules on the recovery membrane of the device, thereby decreasing the surface area of the recovery membrane onto which the one or more macromolecules are captured.

* * * * *